(No Model.) 3 Sheets—Sheet 1.

E. A. HAUERWAS.
AUTOMATIC ELECTROMAGNETIC BRAKE FOR RAILWAY CARS.

No. 569,101. Patented Oct. 6, 1896.

WITNESSES:
William P. Goebel
C. R. Ferguson

INVENTOR
E. A. Hauerwas
BY
Munn & Co.
ATTORNEYS.

(No Model.) 3 Sheets—Sheet 2.
E. A. HAUERWAS.
AUTOMATIC ELECTROMAGNETIC BRAKE FOR RAILWAY CARS.
No. 569,101. Patented Oct. 6, 1896.
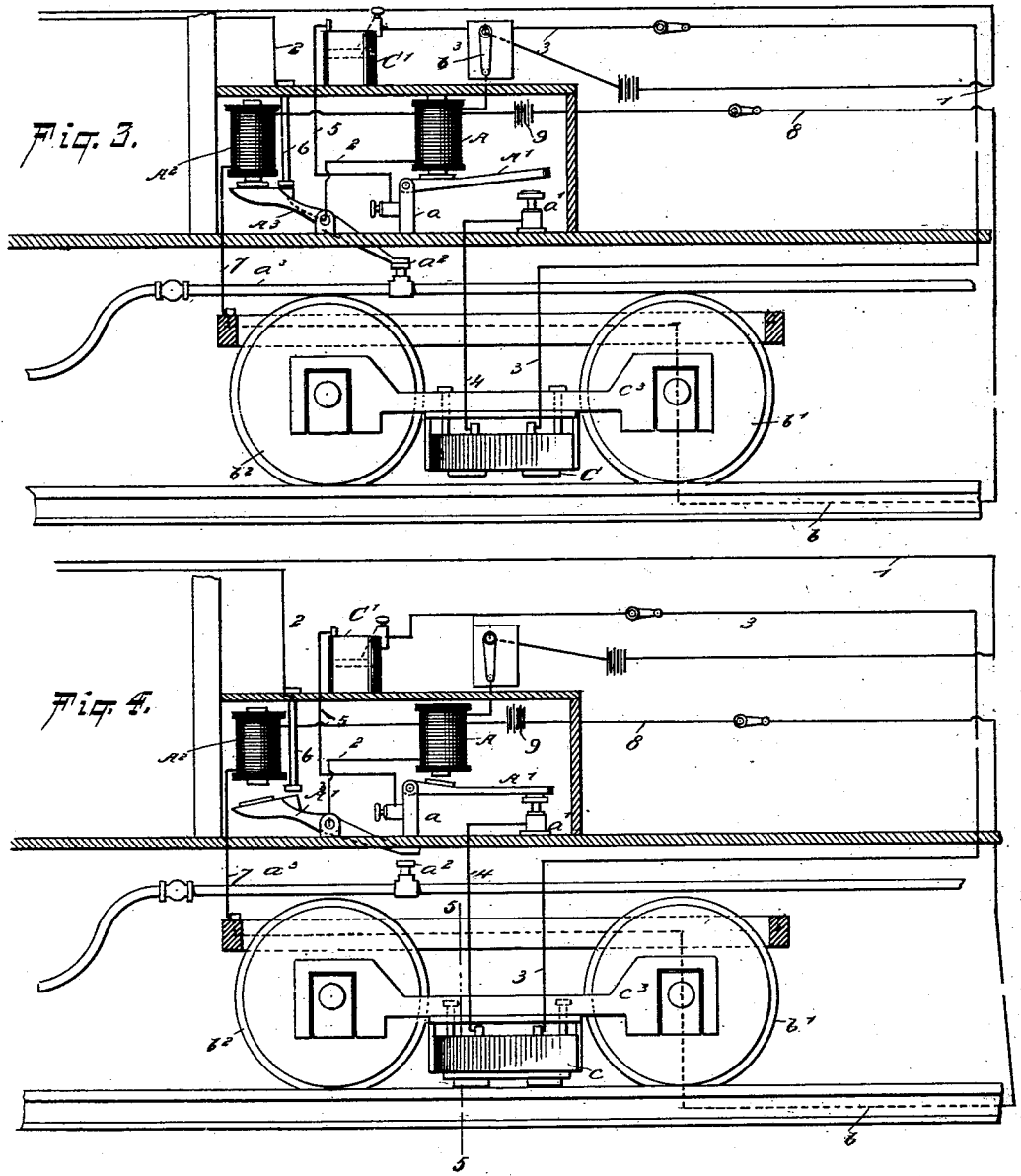
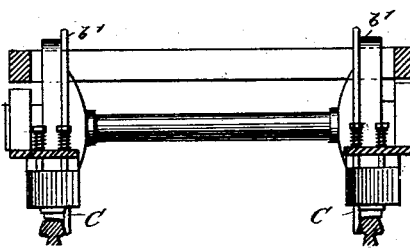
WITNESSES:
INVENTOR
BY
ATTORNEYS.

(No Model.) 3 Sheets—Sheet 3.

E. A. HAUERWAS.
AUTOMATIC ELECTROMAGNETIC BRAKE FOR RAILWAY CARS.

No. 569,101. Patented Oct. 6, 1896.

WITNESSES:
William P. Goebel.
C R Ferguson

INVENTOR
E. A. Hauerwas
BY Munn & Co
ATTORNEYS.

UNITED STATES PATENT OFFICE.

EDGAR A. HAUERWAS, OF SARATOGA SPRINGS, NEW YORK.

AUTOMATIC ELECTROMAGNETIC BRAKE FOR RAILWAY-CARS.

SPECIFICATION forming part of Letters Patent No. 569,101, dated October 6, 1896.

Application filed May 23, 1895. Serial No. 550,425. (No model.)

*To all whom it may concern:*

Be it known that I, EDGAR A. HAUERWAS, of Saratoga Springs, in the county of Saratoga and State of New York, have invented certain new and useful Improvements in Automatic Electromagnetic Brakes for Railway-Cars, of which the following is a full, clear, and exact description.

This invention relates to auxiliary or emergency brakes to be used in steam-railway trains or on electric-railway cars.

The object of the invention is to provide a brake that in an emergency may be used in connection with the ordinary brake to stop a car or train.

The invention consists, first, in electromagnets normally in an open circuit, but adapted to engage with a track-rail upon closing the circuit.

It further consists in means whereby the magnet-circuit may be closed by the opening of a normally-closed main circuit either at the engine or upon any car.

It further consists in means for automatically closing the circuit and operating the air-brakes should a truck be derailed.

It further consists in the construction and novel arrangement of parts, as will hereinafter appear, and be more particularly pointed out in the appended claims.

Reference is to be had to the accompanying drawings, forming a part of this specification, in which similar characters of reference indicate corresponding parts in all the figures.

Figure 1:
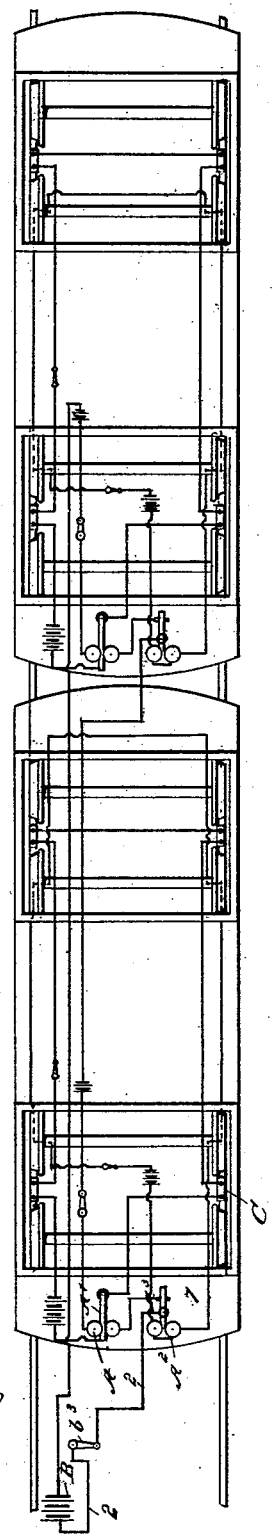
Figure 2:
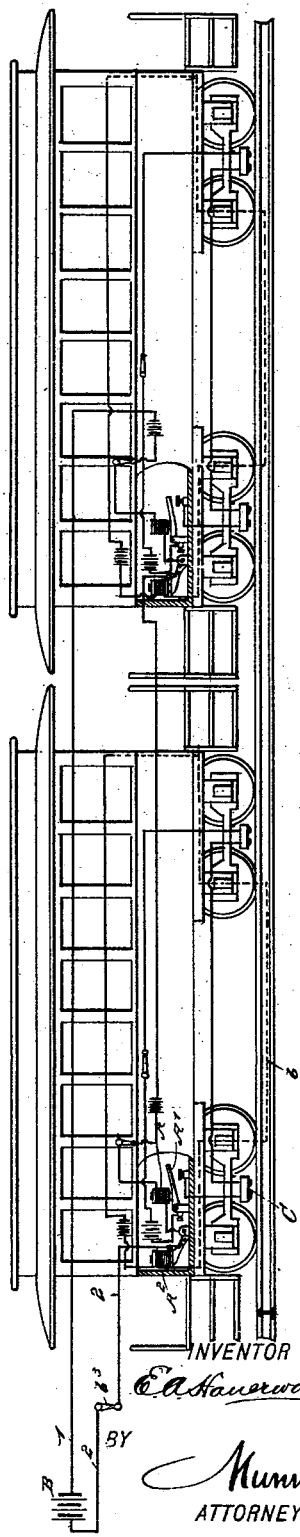
Figure 6:
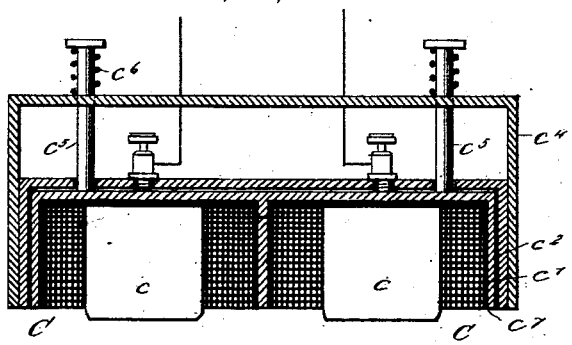
Figure 7:
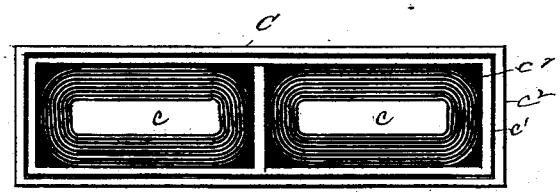
Figure 8:
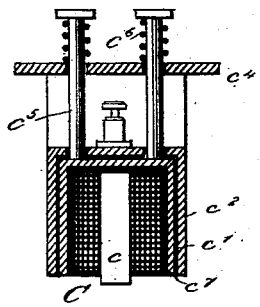

Figure 1 is a diagrammatic plan view of a braking system embodying my invention. Fig. 2 is a side elevation of railway-cars, showing an arrangement of the brakes and circuits. Fig. 3 is an elevation showing the brake-magnets out of engagement with the track, and therefore in open circuit. Fig. 4 is a view similar to Fig. 3, but showing the circuit closed and the brake in contact with the track. Fig. 5 is a section on the line 5 5 of Fig. 4. Fig. 6 is a longitudinal vertical section, on an enlarged scale, of the brake-magnet. Fig. 7 is a bottom plan view thereof, and Fig. 8 is a transverse section.

It will be understood that all the electromagnetic brakes of a car are under the control of a battery or other source of electricity carried by the car. Therefore the brakes of a car are in what may be termed a "local" circuit normally open. The closing mechanism for the local circuit is in what may be termed a "main" circuit normally closed, extending the full length of a train and to the engine, where the battery may be located, or a battery may be located on each car.

I will first describe the main circuit and the brake-controlling apparatus in the circuit and carried by each car.

Referring to the drawings, A designates an electromagnet coacting with the armature A' to hold the local circuit normally open. The armature A' is pivotally connected at one end to a post $a$, and is adapted to engage its other end with a contact-post $a'$.

The electromagnets A and the armature $A^3$ of an electromagnet $A^2$ are in the circuit comprising the main wires 1 2, extending from a source of electricity, (here shown as a battery B.) The circuit-wire 2 comprises a contact-finger 6, normally in engagement with the armature $A^3$, as shown in Fig. 3.

The main circuit has a circuit-closer key $b^3$ in the engine and under the control of the engineer. There may be a circuit-closer $b^3$ on each car, as indicated, so that the system is under the control of a conductor or other attendant.

$A^2$ is an electromagnet coacting with the armature $A^3$ to control the air-brake of a car. The armature $A^3$ at its outer end has a valve connection $a^2$ with a pipe $a^3$, leading to the air-brake, which it is not deemed necessary to illustrate. The valve $a^2$ will be held normally closed; but it is obvious that when the circuit is opened by any cause the electromagnet $A^2$ will be deënergized, so that the weighted end of the armature $A^3$ will fall away and thus operating to open the valve $a^2$ to allow the exhaust of air to operate the air-brake in the usual manner, and the detaching of the armature $A^3$ from the contact-finger 6 will open the main line and close the local circuit in which brake-magnets are located. The electromagnet $A^2$ is in the circuit having the wires 7 8, and a track-section $b$ between the trucks of a car is in this circuit, so that should the wheels $b'$ $b^2$ of a truck be derailed the circuit will be broken through the track-section, and thus the magnet $A^2$ will be deënergized, and both the air-brake and the electromagnet-brake adjacent to trucks remaining on the track will be operated. As here shown, the circuit 7 8 has a battery 9, carried by the car, and the wire 7 leads to the track through the truck frame and wheels.

I will now describe an electromagnetic brake, it being understood that there is one at each side of each truck.

C designates the electromagnets, each having a pole-piece or core $c$. The magnets are here shown as placed directly over the track in a casing $c'$, adapted to slide vertically in a fixed casing $c^2$, supported from the equalizer-bar $c^3$ by means of a bracket or hanger $c^4$. The brake-magnet is suspended by means of rods $c^5$, extended from the casing $c'$ through openings in the top of the casing $c^2$ and through openings in the top plate of the bracket or hanger $c^4$, and springs $c^6$ are interposed between the top plate of the bracket or hanger and the heads of the rods $c^5$. It is to be understood other means than the one shown and described may be employed for yieldingly supporting the brake-magnets.

As the casings $c'$ $c^2$ are designed to be of metal the electromagnet should be suitably insulated therefrom, as indicated at $c^7$. From one pole of the brake-magnet a wire 3 leads to one pole of the local battery C', and from the other pole of the brake-magnet a wire 4 leads to the contact-post $a'$, and a wire 5 leads from the post $a'$ to the other pole of the local battery.

It is obvious that the electromagnet $A^2$ and its connections with an air-brake may be omitted from the system without departing from the spirit of my invention, but I prefer to employ the same for the purpose for which it is designed.

From the foregoing description the operation of the device is quite obvious, but it may here be restated as follows: Should an engineer or other attendant in an emergency desire to operate the electromagnetic brakes, he breaks the main circuit by opening the circuit-closer $b^3$, and thus the electromagnet A will be deënergized and its armature A' will engage the post $a'$, so that the local circuit will be closed. Upon the closing of the local circuit the electromagnets C will be energized and they will be drawn downward to a magnetic engagement with the track, as indicated in Fig. 4, and as the magnets are very strong it is obvious that the same will bring a train to a standstill in a comparatively short run. Should the wheels of a truck be derailed, the main circuit will be broken to operate the parts and the air-brake will be operated, as heretofore described.

It is obvious that my electromagnetic brake may be applied to an electrically-propelled car and its energy taken from the car-propelling current.

Having thus described my invention, I claim as new and desire to secure by Letters Patent—

1. A train-braking system, comprising electromagnetic brakes adapted to engage with a track between the wheels of a truck, a normally-open local circuit in which the brakes are located, a source of electricity for said local circuit including an electromagnet controlling a circuit-closer operating to close all the local circuits of a train, a normally-closed circuit in which the circuit-closer is located and a source of electricity for said normally-closed circuit, substantially as specified.

2. An electromagnetic brake for a car adapted to engage with the track on which the car-wheels move, a local open circuit comprising a source of electricity, the said brake being located in said local circuit, a normally-closed main circuit, comprising an electromagnet controlling an armature in the local circuit, and another local circuit, comprising a track-section, an electromagnet in said last-named local circuit, the armature thereof being in the main circuit, substantially as specified.

3. A car-brake comprising an electromagnet in a normally-open local circuit, a closer for said local circuit and a main circuit for controlling said closer, an air-brake-controlling armature comprised in said main circuit, and an electromagnet in a circuit comprising a track-section for controlling said armature, substantially as specified.

4. In a car-brake the electromagnets in a normally-open local circuit, a closer for the local circuit, consisting of an armature held by an electromagnet in a main circuit, a normally-closed main circuit, an electromagnet in the main circuit for controlling the closer of the local circuit and an electromagnet in a circuit comprising a section of the track for operating an air-brake and the electromagnetic brakes adjacent to the car-wheels remaining on the track, substantially as specified.

EDGAR A. HAUERWAS.

Witnesses:
JOHN C. BOLSTER,
FRED J. BURNHAM.